(12) United States Patent
Torii et al.

(10) Patent No.: US 6,591,707 B2
(45) Date of Patent: Jul. 15, 2003

(54) GEARED MOTOR HAVING WORM WHEEL DRIVINGLY CONNECTED TO OUTPUT SHAFT

(75) Inventors: Katsuhiko Torii, Hamamatsu (JP); Tadashi Adachi, Kosai (JP); Hirofumi Sakai, Hamana-gun (JP); Shingo Omori, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/904,897

(22) Filed: Jul. 16, 2001

(65) Prior Publication Data

US 2002/0011127 A1 Jan. 31, 2002

(30) Foreign Application Priority Data

Jul. 31, 2000 (JP) .......................... 2000-231761
Jul. 31, 2000 (JP) .......................... 2000-231762

(51) Int. Cl.$^7$ .......................... F16H 57/02; F16H 1/16
(52) U.S. Cl. .................................. 74/425; 74/89.14
(58) Field of Search ................. 74/411, 425, 89.14; 464/73, 76, 92, 149, 97, 75; 49/460; 242/125.1

(56) References Cited

U.S. PATENT DOCUMENTS

| 3,398,590 A | * | 8/1968 | Campbell et al. .......... 74/89.14 |
| 3,635,100 A | * | 1/1972 | Littmann .................... 74/411 |
| 4,428,250 A | * | 1/1984 | Becker et al. ............... 74/425 |
| 4,899,608 A | * | 2/1990 | Knappe et al. .............. 74/411 |
| 5,040,430 A | * | 8/1991 | Adam et al. ................. 74/425 |
| 5,178,026 A | * | 1/1993 | Matsumoto ................. 74/411 |
| 5,267,482 A | * | 12/1993 | Yoshida et al. .............. 74/425 |
| 5,404,975 A | * | 4/1995 | Michele .................. 74/425 X |
| 5,566,592 A | * | 10/1996 | Adam et al. ............. 74/425 X |
| 5,653,144 A | * | 8/1997 | Fenelon ....................... 74/411 |
| 5,761,964 A | * | 6/1998 | Yamada et al. .............. 74/425 |
| 5,943,913 A | * | 8/1999 | Fenelon ....................... 74/411 |
| 5,956,998 A | * | 9/1999 | Fenelon ................. 74/89.14 X |
| 6,169,346 B1 | * | 1/2001 | Nakamura et al. ....... 74/411 X |
| 6,393,929 B1 | * | 5/2002 | Quere et al. ................. 74/411 |

FOREIGN PATENT DOCUMENTS

| EP | 0563410 A1 | * | 3/1992 |
| EP | 860572 | | 11/1997 |

* cited by examiner

Primary Examiner—David A. Bucci
Assistant Examiner—Colby Hansen
(74) Attorney, Agent, or Firm—Posz & Bethards, PLC (57) ABSTRACT

In a geared motor, a cover plate is fitted to an opening of a housing of a geared motor. The cover plate includes an output shaft hole, a rib and a short cylindrical portion. The output shaft hole penetrates through a center of the cover plate and rotatably receives an output shaft therethrough. The rib is formed along an outer peripheral edge of the cover plate and is radially supported by the housing. The short cylindrical portion is slidably engageable with an outer peripheral surface of the output shaft for radially supporting the output shaft. An inner peripheral surface of a worm wheel is slidably engageable in line contact with a sliding ridge of a disk plate of the output shaft.

20 Claims, 5 Drawing Sheets

GEARED MOTOR HAVING WORM WHEEL DRIVINGLY CONNECTED TO OUTPUT SHAFT

CROSS REFERENCE TO RELATED APPLICATION

This application is based on and incorporates herein by reference Japanese Patent Application No. 2000-231761 filed on Jul. 31, 2000 and Japanese Patent Application No. 2000-231762 filed on Jul. 31, 2000.

BACKGROUND OF THE INVENTION

1. Field of the Invention

The present invention relates to a geared motor, and more specifically to a geared motor used in a power window system for moving up and down a vehicle door window glass.

2. Description of Related Art

For example, in the power window system for moving up and down the vehicle door window glass or a power sunroof system for moving a vehicle sunroof forward and backward, a geared motor is used as a drive source.

In one previously proposed geared motor, rotational speed of a rotatable shaft of the motor is reduced through a worm and a worm wheel and is outputted from an output shaft that is connected to an end system (e.g., the power window system). The rotatable shaft of the motor is connected to the worm shaft, which is, in turn, meshed with the worm wheel. The worm wheel and the output shaft are rotatably received around a support shaft that is secured to a base of a housing of the motor.

In the previously proposed geared motor, only the one end of the support shaft is secured to the housing (i.e., acting like a cantilever). Thus, relatively large flexure of the support shaft is observed when the output shaft is locked, for example, due to clamping of a foreign object (e.g., human body) between the door window glass of the power window system and a doorframe.

To reduce the flexure of the support shaft when the output shaft is locked, a support hole for supporting the other end of the support shaft is provided in the end system (e.g., the power window system) connected to the geared motor.

However, the previously proposed geared motor and the previously proposed method of supporting the support shaft of the geared motor cannot effectively reduce the flexure of the support shaft by the geared motor alone. Thus, the flexure of the support shaft largely depends on dimensional precision and positional precision of the support hole provided in the end system and also on assembling precision of the geared motor and the end system. As a result, the flexure of the support shaft could exceed a predetermined amount of flexure.

In such a case, appropriate engagement between the worm wheel and the worm cannot be maintained due to the flexure of the support shaft that supports the worm wheel, so that generation of noises in a gear unit and a reduction in durability of the geared motor are likely to occur. In addition, sealing of sliding portion between the support shaft and the output shaft can be deteriorated, so that penetration of water or the like into the housing is allowed, resulting in failure (malfunction) of the geared motor.

Furthermore, in one such previously proposed geared motor, the worm wheel is drivingly connected to a circular disk plate (rotation transmitting portion) of the output shaft through a cushion rubber. The worm wheel is shaped into a generally cylindrical shape and has a base at one end and an opening at the other end. In order to achieve a size reduction, the cushion rubber and the disk plate of the output shaft are received within the cylindrical worm wheel in such a manner that an inner peripheral surface of the worm wheel is slidably engageable with an outer peripheral surface of the disk plate of the output shaft.

Since the inner peripheral surface of the worm wheel slidably engages with the outer peripheral surface of the disk plate of the output shaft, it is possible to restrain radially inward flexure of a cylindrical peripheral wall of the worm wheel by a force radially inwardly exerted from the worm against the worm wheel.

In this geared motor, the worm wheel and the disk plate of the output shaft are normally rotated together through the cushion rubber. However, when the output shaft is locked, the worm wheel is allowed to rotate for a limited angular distance relative to the disk plate of the locked output shaft due to the fact that the cushion rubber is deformed to allow the rotation of the worm wheel for the limited angular distance. This relative rotation restrains application of an excessively large load against the motor when the output shaft is locked. In the previously proposed geared motor, the worm wheel is made of the resin material, and the disk plate is made of a metal material. Since a rigidity of the resin worm wheel is different from the metal disk plate, noises are relatively small (if any) when the worm wheel rotates relative to and slides along the disk plate of the output shaft during the locked state of the output shaft.

In order to reduce a weight of the geared motor, it is conceivable to make the disk plate with a resin material.

However, in the previously proposed geared motor, the inner peripheral surface of the worm wheel makes surface contact with the outer peripheral surface of the disk plate. Thus, if the disk plate of the output shaft is made of the resin material, the rigidity of the worm wheel becomes similar to the rigidity of the disk plate, so that relatively large noises can be generated between the worm wheel and the disk plate when the worm wheel frictionally slides along the disk plate during the locked state of the output shaft.

SUMMARY OF THE INVENTION

The present invention addresses the above disadvantages. Thus, it is an objective of the present invention to provide a geared motor capable of reducing flexure of a support shaft when an output shaft is locked. It is another objective of the present invention to provide a geared motor that is capable of reducing noises generated between a worm wheel and a disk plate of an output shaft when the output shaft is locked.

To achieve the objectives of the present invention, there is provided a geared motor including a housing, a support shaft, an output shaft and a cover. The housing is shaped into a generally cylindrical shape and has a base at one end and an opening at the other end thereof. The housing receives a worm and a worm wheel. The worm is connected to a rotatable shaft of the motor. The worm wheel is meshed with the worm. The support shaft extends along a rotational axis of the worm wheel and has one end secured to the base of the housing and the other end extending out of the housing. The support shaft rotatably supports the worm wheel. The output shaft is rotatably supported about the support shaft and has one end extending out of the housing. The output shaft receives rotation of the worm wheel. The cover is shaped into a disk shape and covers the opening of the housing. The cover includes an output shaft hole, an engaging portion and a shaft support portion. The output shaft hole penetrates through a center of the cover and rotatably receives the output shaft therethrough. The engaging portion is formed along an outer peripheral edge of the cover and is radially supported by the housing. The shaft support portion is slidably engageable with an outer peripheral surface of the output shaft for radially supporting the output shaft.

There is also provided a geared motor including a worm, a worm wheel and an output shaft. The worm is connected to a rotatable shaft of the motor. The worm wheel is meshed with the worm. The worm wheel is shaped into a generally cylindrical shape and has a base at one end and an opening at the other end thereof. The output shaft has a rotation transmitting portion as an integral part thereof. The rotation transmitting portion is coaxially placed within the worm wheel. The worm wheel is allowed to rotate continuously together with the rotation transmitting portion of the output shaft while the output shaft is not locked. The worm wheel is allowed to rotate only for a predetermined angular distance relative to the rotation transmitting portion of the output shaft when the output shaft is locked. An inner peripheral portion of the worm wheel is slidably engageable in line contact with an outer peripheral portion of the rotation transmitting portion of the output shaft.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
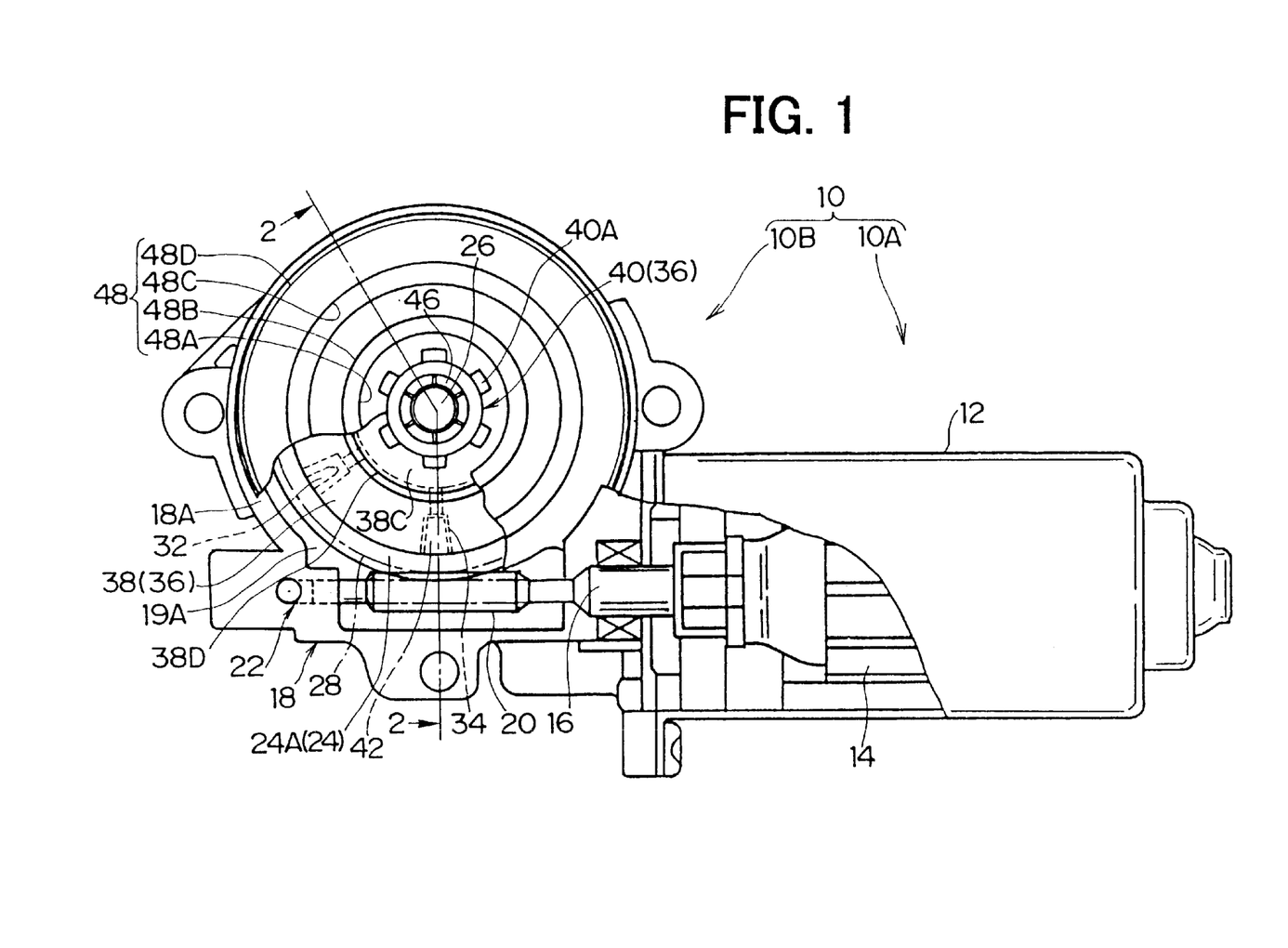
FIG. 1 is a partially cutaway plan view of a geared motor according to an embodiment of the present invention.
Figure 2:
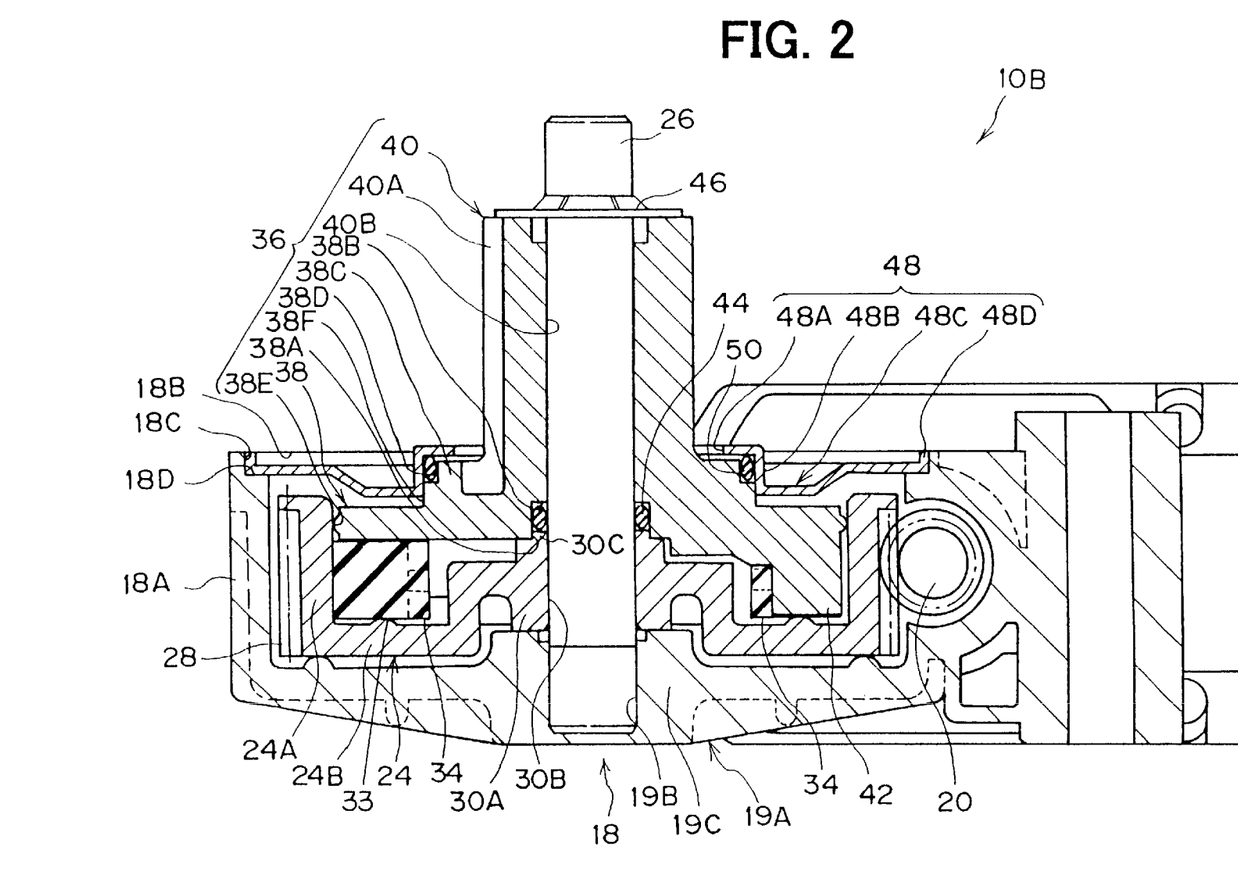
FIG. 2 is a cross-sectional view along line 2—2 in FIG. 1.

A geared motor 10 according to one embodiment of the present invention will be described with reference to FIGS. 1 to 3.

The geared motor 10 includes a motor unit 10A and a gear unit 10B connected to the motor unit 10A. Within a yoke 12 of the motor unit 10A, one end of an armature shaft 16 of an armature 14 (rotatable shaft of the motor) is supported by a bearing (not shown).

A distal end of the armature shaft 16 extends into an interior of a motor housing 18 of the gear unit 10B connected to the yoke 12.

In the gear unit 10B, a worm 20 is connected to the armature shaft 16. A distal end of the worm 20 is supported by the motor housing 18 via a bearing 22. The motor housing 18 is generally cup shaped and has a cylindrical portion 18A, a base portion 19A and an opening 18B. The motor housing 18 receives the worm 20 and a worm wheel 24 that is meshed with the worm 20. In the cylindrical portion 18A of the motor housing 18, a cover support surface 18C and a cover engaging surface 18D are formed. The cover support surface 18C is formed in an end of the cylindrical portion 18A at the opening 18B and has an increased inner diameter that is increased with respect to the rest of the cylindrical portion 18A. The cover engaging surface 18D constitutes a step that is formed as a result of the increase in the inner diameter of the cylindrical portion 18A at the cover support surface 18C.

At the center of the base portion 19A of the motor housing 18, there is formed a boss 19C having a blind boss hole 19B. A center shaft 26 acting as a support shaft is secured within the boss hole 19B of the boss 19C at one end.

Figure 3:
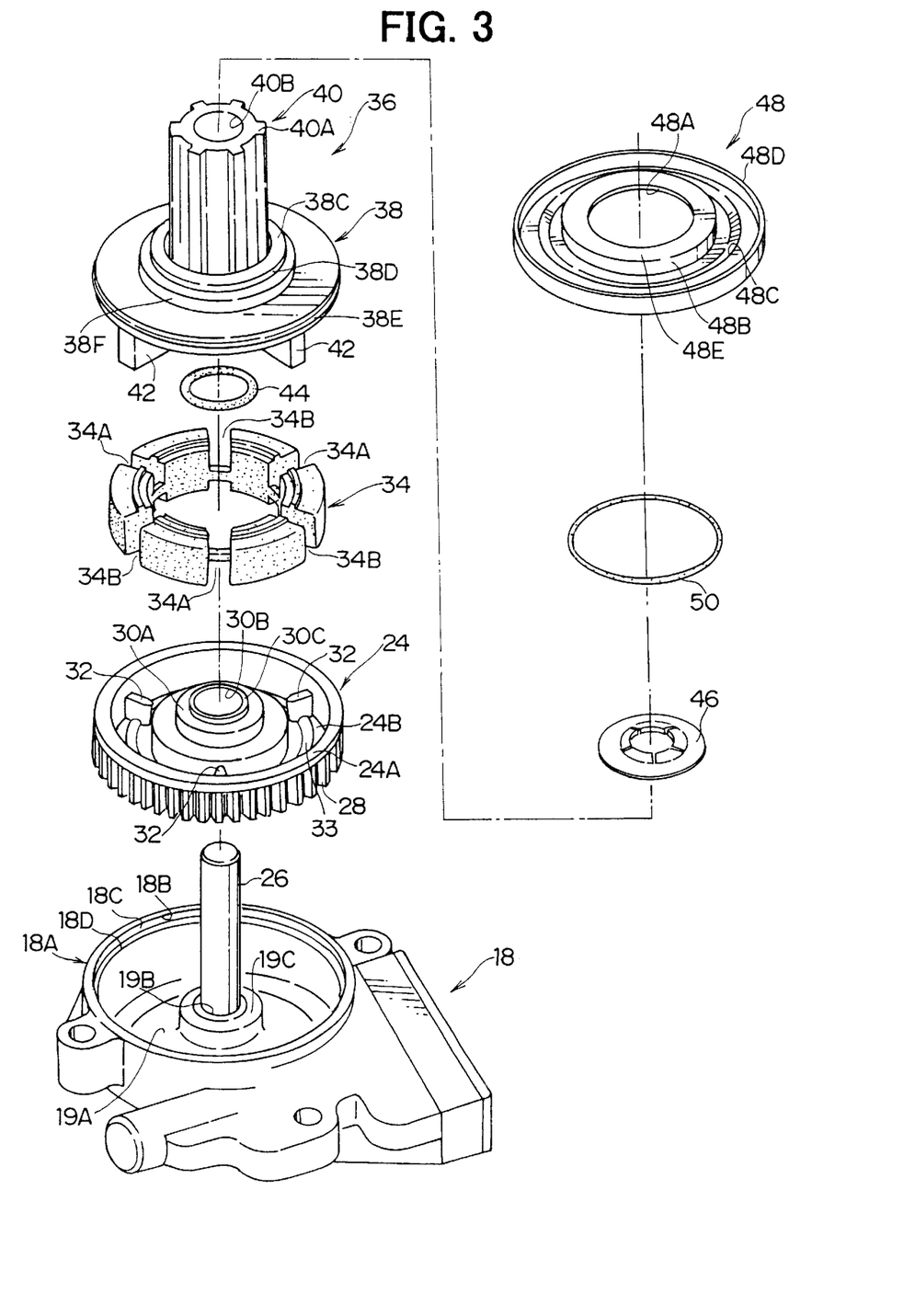
FIG. 3 is an exploded partial perspective view of the geared motor according to the embodiment.

As shown in FIG. 3, the gear unit 10B includes the worm wheel 24. The worm wheel 24 is generally cup shaped or is generally cylindrically shaped and includes a cylindrical portion 24A and a base portion 24B. A worm gear 28 is formed in an outer peripheral portion of the cylindrical portion 24A and is meshed with the worm 20. The worm wheel 24 further includes a support boss 30A. The support boss 30A axially protrudes from the center of the base portion 24B of the worm wheel 24 and is thickened. A shaft hole 30B axially penetrates through the support boss 30A and has an inner diameter substantially equal to an outer diameter of the center shaft 26. The shaft hole 30B receives and slidably engages with the center shaft 26. The support boss 30A also includes an annular small protrusion 30C having an inner peripheral surface that extends along an inner peripheral surface of the shaft hole 30B. With the above-described structure, upon insertion of the center shaft 26 within the shaft hole 30B and engagement of an end surface of the boss 19C with an opposing end surface of the support boss 30A, the worm wheel 24 is rotatably (slidably) supported, and the worm gear 28 formed in the outer peripheral portion of the cylindrical portion 24A is meshed with the worm 20.

In the base portion 24B of the worm wheel 24, a plurality (three in this embodiment) of engaging projections 32 are arranged at substantially equal angular intervals along an inner peripheral surface (inner peripheral portion) of the cylindrical portion 24A.

A cushion rubber 34 is received within an interior of the worm wheel 24. The cushion rubber 34 has a generally cylindrical shape with a relatively small height and includes a plurality (a total of six in this embodiment) of slits 34A, 34B (three each in this embodiment). The slits 34A and the slits 34B are alternatively arranged at substantially equal angular intervals along an outer peripheral portion of the cushion rubber 34. The cushion rubber 34 is received on the base portion 24B of the worm wheel 24 within the cylindrical portion 24A, and the engaging projections 32 of the worm wheel 24 are received within the corresponding slits 34A of the cushion rubber 34.

The gear unit 10B also includes an output shaft 36. The output shaft 36 is made of a resin material and includes a circular disk plate 38 and an output gear 40. The disk plate 38 acts as a rotation transmitting portion of the present invention. The output gear 40 has teeth 40A along its outer peripheral portion. The output shaft 36 includes a seal retaining hole 38A and a support hole 40B. The seal retaining hole 38A extends from the plate 38 side of the output shaft 36. The seal retaining hole 38A has an inner diameter, which is larger than the outer diameter of the center shaft 26 and is substantially equal to an outer diameter of the protrusion 30C of the worm wheel 24. The support hole 40B extends from the output gear 40 side of the output shaft 36 and has an inner diameter substantially equal to the outer diameter of the center shaft 26. The seal retaining hole 38A has a depth that corresponds to a size of an O-ring 44 described later in greater detail and is communicated with the support hole 40B at its end. A step 38B is formed at a boundary between the seal retaining hole 38A and the support hole 40B. A stepped thick portion 38C is formed in a boundary between the plate 38 and the output gear 40. A stepped seal retaining surface 38D is formed along an outer peripheral edge of the thick portion 38C. A plurality (three in this embodiment) of engaging pieces 42 corresponding to the slits 34B of the cushion rubber 34 are provided at substantially equal angular intervals in an end surface of the plate 38 on a side where the seal retaining hole 38A is formed.

Figure 5A:
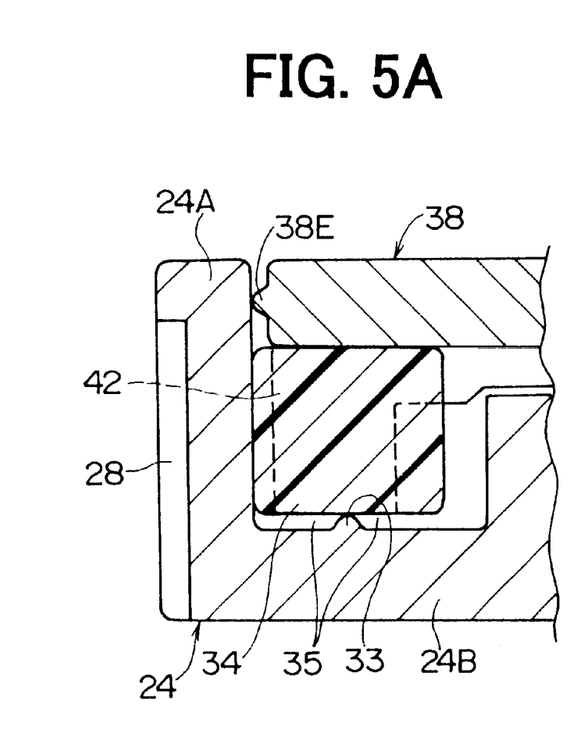
FIG. 5A is an enlarged partial cross-sectional view showing a worm wheel and a disk plate of an output shaft in a slidably engaged state.

A sliding ridge 38E is integrally formed along an outer peripheral surface (outer peripheral portion) of the plate 38. The sliding ridge 38E has an arcuate cross section as clearly shown in FIG. 5A and extends all around the outer peripheral surface of the plate 38. An apex of the sliding ridge 38E can slidably engage in line contact with the inner peripheral surface (inner peripheral portion) of the cylindrical portion 24A of the worm wheel 24.

Once the center shaft 26 is received within the support hole 40B, and the engaging pieces 42 are received within the corresponding slits 34B of the cushion rubber 34, the output shaft 36 is placed on the cushion rubber 34. Rotation of the worm wheel 24 is transmitted to the output shaft 36 through the engaging projections 32 and the cushion rubber 34. At this state, the plate 38 is placed within the cylindrical portion 24A of the worm wheel 24, and the end surface of the support boss 30A of the worm wheel 24 is slidably engaged with the end surface of the plate 38 around the seal retaining hole 38A.

Furthermore, in the gear unit 10B, the O-ring 44 is fitted around the center shaft 26. The O-ring 44 is compressed between the outer peripheral surface of the center shaft 26 and the inner peripheral surface of the seal retaining hole 38A to prevent intrusion of water or the like into the interior of the motor housing 18 along a boundary between the center shaft 26 and the support hole 40B of the output shaft 36. The O-ring 44 is axially placed between the step 38B of the output shaft 36 and the projection 30C of the worm wheel 24 received within the seal retaining hole 38A, so that the O-ring 44 is prevented from coming out of the seal retaining hole 38A.

A lock washer 46 is fitted around a free end of the center shaft 26 at a free end of the output gear 40 to prevent the worm wheel 24 and the output shaft 36 from coming out of the center shaft 26.

A cover plate 48 acting as a cover of the present invention is then fitted to the opening 18B of the motor housing 18. The cover plate 48 is made of a metal material and has a generally disk shape. An output shaft hole 48A penetrates through the center of the cover plate 48. The output shaft hole 48A has an inner diameter greater than an outer diameter of the output gear 40. A short cylindrical portion 48B is formed radially outward of the output shaft hole 48A in the cover plate 48. The short cylindrical portion 48B protrudes axially toward the plate 38 (toward the bottom side in FIG. 2) from a radially middle part of the cover plate 48 and acts as a shaft support portion (cylindrical portion) that has an inner diameter substantially equal to an outer diameter of the thick portion 38C of the output shaft 36. The short cylindrical portion 48B extends continuously all around an outer peripheral surface of the thick portion 38C of the output shaft 36. At one end (top end in FIG. 2) of the short cylindrical portion 48B, a wall portion 48E (FIG. 3) is provided radially inward of and is connected to the short cylindrical portion 48B. At the other end (bottom end in FIG. 2) of the short cylindrical portion 48B, an annular recess 48C is formed radially outward of the short cylindrical portion 48B in the cover plate 48. The recess 48C extends circumferentially along the other end of the short cylindrical portion 48B. A rib 48D acting as an engaging portion is formed all around an outer peripheral portion or an outer peripheral edge of the cover plate 48. A portion of the cover plate 48 located between the recess 48C and the rib 48D constitutes a flat surface. The rib 48D is radially resiliently deformable and is tapered toward its base before the cover plate 48 is installed to or is fitted to the motor housing 18. Thus, the base of the rib 48D has an outer diameter slightly smaller than the inner diameter of the cover support surface 18C of the motor housing 18. The top end of the rib 48D has an outer diameter slightly larger than the inner diameter of the cover support surface 18C before the cover plate 48 is installed to the motor housing 18. The short cylindrical portion 48B, the recess 48C and the rib 48D add rigidity to the cover plate 48.

Once the output gear 40 is rotatably received within the output shaft hole 48A of the cover plate 48, and the cover plate 48 is press fitted to the opening 18B of the motor housing 18, the tapered outer peripheral surface of the rib 48D is fitted to and deformed in conformity with the cover support surface 18C (inner peripheral surface of the opening 18B) of the motor housing 18. Also, the end surface of the cover plate 48 opposite to the rib 48D engages the cover engaging surface 18D of the motor housing 18. In this manner, the motor housing 18 and the cover plate 48 cooperate together to form a strong structure having a substantially closed cross-section.

Furthermore, at this state, an inner peripheral surface of the short cylindrical portion 48B of the cover plate 48 slidably engages with the outer peripheral surface of the thick portion 38C of the output shaft 36 all around the outer peripheral surface of the thick portion 38C.

Also, at this state, an O-ring 50 arranged around the seal retaining surface 38D in the thick portion 38C of the output shaft 36 is pressed radially inwardly by the inner peripheral surface of the short cylindrical portion 48B. With this arrangement, penetration of water or the like into the interior of the motor housing 18 along a boundary between the output shaft 36 and the cover plate 48 can be advantageously restrained.

A lubricant (e.g., grease, oil or the like) is applied between the center shaft 26 and the shaft hole 30B of the worm wheel 24, between the center shaft 26 and the support hole 40B of the output shaft 36, between the boss 19C of the motor housing 18 and the support boss 30A of the worm wheel 24, between the end surface of the support boss 30A of the worm wheel 24 and the end surface of the plate 38 of the output shaft 36, and around the O-ring 44 and O-ring 50 to allow smooth slide movement of these components.

Operation of the present embodiment will now be described.

In the above-described geared motor 10, when the motor unit 10A is activated to rotate the armature shaft 16, the worm wheel 24 meshed with the worm 20, which is in turn connected to the armature shaft 16, is rotated about the center shaft 26, so that a rotational speed of the armature shaft 16 is reduced at the worm wheel 24. A rotational force of the worm wheel 24 is transmitted to the cushion rubber 34 through the engaging projections 32 received within the corresponding slits 34A of the cushion rubber 34. Then, a rotational force of the cushion rubber 34 is transmitted to the plate 38 through the engaging pieces 42 received within the corresponding slits 34B of the cushion rubber 34.

The plate 38 and the output gear 40 are formed as the integral output shaft 36 and rotate together. Thus, the output gear 40 is also rotated by the rotational force transmitted to the plate 38 to drive an end system or device (e.g., the power window system) connected thereto.

Figure 4A:
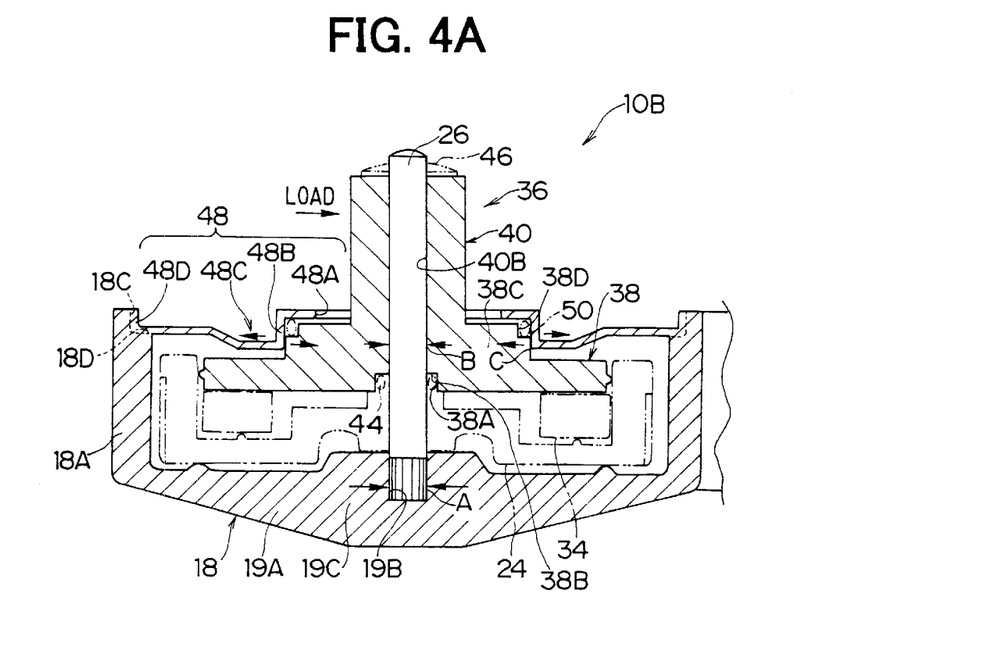
FIG. 4A is a cross-sectional view of the geared motor according to the embodiment, showing support for a center shaft of the geared motor.

On the other hand, for example, when a foreign object is clamped between a door window glass of the power window system and a doorframe during rotation of the motor, the output shaft 36 is locked (rotation of the output shaft 36 is prevented). As shown in FIG. 4A, when the output shaft 36 is locked, a radial moving force (load) is applied to the output shaft 36, to which the driving force of the motor unit 10A is transmitted, due to slip at the connection to the end system. This moving force acts as a flexural load (moment acting in the bending direction) to the center shaft 26 that rotatably supports the output shaft 36.

As described above, the cover plate 48 is fitted to the cover support surface 18C (inner peripheral surface of the opening 18B) of the motor housing 18, and the rib 48D of the cover plate 48 is resiliently deformed against and is radially supported by the cover support surface 18C. Thus, the motor housing 18 and the cover plate 48 form the integral body that has the strong structure having the substantially closed cross-section. The short cylindrical portion 48B of the cover plate 48 engages the outer peripheral surface of the thick portion 38C of the output shaft 36 all around the outer peripheral surface of the thick portion 38C in such a manner that the short cylindrical portion 48B of the cover plate 48 supports the radial force of the output shaft 36. Thus, the radial moving force of the output shaft 36 is supported by the motor housing 18 and the cover plate 48 (the strong structure having the substantially closed cross-section) at the engaging point (support point C shown in FIG. 4A) between the thick portion 38C and the short cylindrical portion 48B, and the amount of radial movement of the support point C is limited to a relatively small amount.

That is, the output shaft 36 forms the structure having the substantially closed cross-section in cooperation with the motor housing 18 and the cover plate 48 and supports the center shaft 26 at the axial point (support point B shown in FIG. 4A) corresponding to the support point C.

In this way, the center shaft 26 is supported at the two points, that is, at the fixed point (support point A shown in FIG. 4A) in the boss hole 19B of the motor housing 18 and the support point B where the amount of the flexure is limited to the relatively small amount. Since the amount of radial movement at the support point C is limited to the relatively small amount, the amount of movement of the support point B (flexure at the support point B) is also limited to the relatively small amount.

Thus, the flexure of the base portion of the center shaft 26 located between the support point A and the support point B (that is, the base portion of the center shaft 26 located within the motor housing 18) depends on the flexure of the support point B and is thereby limited to a relatively small amount. As a result, appropriate engagement between the worm 20 and the worm wheel 24 is maintained, so that generation of noises from the engaged portion between the worm 20 and the worm wheel 24 is advantageously restrained, and the durability of the geared motor 10 is maintained.

Figure 4B:
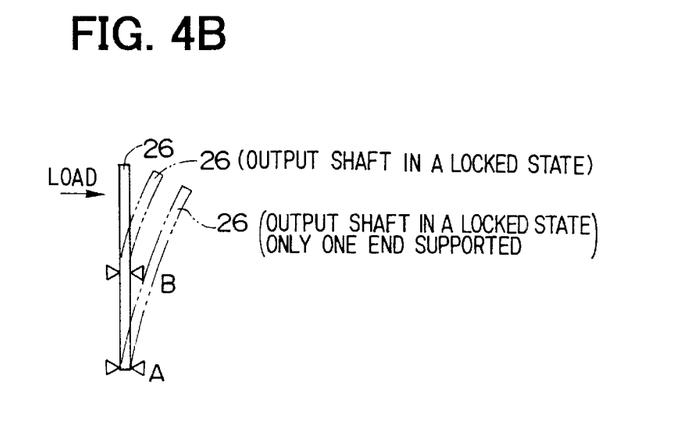
FIG. 4B is a schematic view showing the support for the center shaft of the geared motor.

The flexural load is applied to a distal portion of the center shaft 26 between the support point B and the free end of the center shaft 26 (that is, the distal portion of the center shaft 26 located outside of the motor housing 18). However, the center shaft 26 is supported at the two points, and the unsupported length of the center shaft 26 is shorter in comparison to the previously proposed center shaft that is only supported at its base end, so that the amount of flexure of the center shaft 26 is limited a relatively small amount, as shown in FIG. 4B. Furthermore, a portion of the radial moving force acting on the output shaft 36 is supported by the motor housing 18 and the cover plate 48, so that the flexural load acting on the center shaft 26 is reduced, and the flexure of the center shaft 26 is thereby further reduced. In addition, the moving force acting on the output shaft 36 acts not only as the flexural load to the center shaft 26 but also as the flexural load to the output shaft 36 that is supported at the support point C. Thus, advantages similar to those achieved by increasing a modulus of the center shaft 26 are achieved with the above-described arrangement, so that the flexure of the center shaft 26 is further reduced. As a result, the sealing between the center shaft 26 and the output shaft 36 is not substantially deteriorated by the flexure, and failure of the geared motor 10 due to the penetration of the water or the like into the interior of the motor housing 18 is advantageously restrained.

Furthermore, the cover plate 48 has the recess 48C, so that the rigidity of the cover plate 48 is improved, and the strength of the integral structure, which is composed of the motor housing 18 and the cover plate 48 and has the substantially closed cross-section, is further improved.

The cover plate 48 is made of the metal material, so that the rigidity of the cover plate 48 is further improved, and the integral structure composed of the motor housing 18 and the cover plate 48 is further improved. Particularly, under a high temperature condition (e.g., under about 95 degrees Celsius) normally attainable within a vehicle cabin interior, a reduction in a modulus of elasticity of the metal material is very small, and the rigidity of the cover plate 48 is thereby maintained. Thus, a reduction in the rigidity of the integral structure composed of the cover plate 48 and the motor housing 18 is advantageously restrained.

Furthermore, the output shaft 36 has the thick portion 38C acting as a high-strength member, and the short cylindrical portion 48B of the cover plate engages the thick portion 38C. Thus, there is reduced deformation of the output shaft 36 while the motor housing 18 and the cover plate 48 support the radial load.

Because of the above features, the amount of movement of the support point B is further reduced (achieving the structure similar to one having the center shaft 26 supported only at one point or the support point B), so that it is possible to further restrain the flexure of the center shaft 26 which is encountered when the output shaft 36 is locked.

As described above, in the geared motor 10 according to the present embodiment, it is possible to restrain the flexure of the support shaft which is encountered when the output shaft is locked, so that the generation of the noises in the gear unit and the failure of the geared motor 10 due to the water penetration are advantageously restrained, thereby maintaining the durability of the geared motor 10.

In the above embodiment, the inner peripheral surface of the cylindrical portion 24A of the worm wheel 24 slidably engages in line contact with the sliding ridge 38E of the plate 38 of the output shaft 36 continuously all around the sliding ridge 38E of the plate 38. Thus, the cylindrical portion 24A of the worm wheel 24 is radially supported by the plate 38 received within the cylindrical portion 24A of the worm wheel 24 (the worm wheel 24 and the plate 38 forming a substantially closed cross-section), so that the cylindrical portion 24A can resist against radially inward flexure (deformation) thereof induced by a force applied from the worm 20 meshed with the worm wheel 24.

When the output gear 40 connected to the end system is locked during rotation of the motor, for example, due to clamping of the foreign object between the door window glass of the power window system and the doorframe, further rotation of the plate 38 and the cushion rubber 34 is restrained. During this stage, since the worm wheel 24 is driven by the motor unit 10A through the worm 20, the driving force of the motor unit 10A causes deformation of the cushion rubber 34 through the engaging projections 32, so that the worm wheel 24 is allowed to continue its rotation for a predetermined angular distance corresponding to the deformable amount of the cushion rubber 34. That is, relative rotation occurs between the worm wheel 24 and the plate 38, and the inner peripheral surface of the cylindrical portion 24A of the worm wheel 24 slides along the sliding ridge 38E of the plate 38.

While the inner peripheral surface of the cylindrical portion 24A of the worm wheel 24 slides along the sliding ridge 38E of the plate 38, a control device (not shown) stops the rotation of the motor unit 10A or rotates the motor unit 10A backward to prevent generation of excessive load in the motor unit 10A. Furthermore, during this stage, the cushion rubber 34 is deformed and penetrates into a space 35 defined between a bottom surface of the cushion rubber 34 and the base portion 24B of the worm wheel 24, so that a predetermined amount of sliding movement (the predetermined amount of relative rotation between the worm wheel 24 and the plate 38) is allowed to prevent the generation of excessive load in the motor unit 10A.

In this particular instance, although the worm wheel 24 and the plate 38 are made of the resin material and have similar rigidity, generation of noises between the inner peripheral surface of the cylindrical portion 24A of the worm wheel 24 and the sliding ridge 38E of the plate 38 is well reduced when the output gear 40 is locked. This is due to the fact that the inner peripheral surface of the cylindrical portion 24A of the worm wheel 24 slidably engages with the plate 38 through the apex of the sliding ridge 38E having the arcuate cross-section along the entire perimeter thereof, achieving line contact and thereby minimizing a contact area between the inner peripheral surface of the cylindrical portion 24A of the worm wheel 24 and the plate 38.

Furthermore, since the sliding ridge 38E has the arcuate cross-section, the line contact between the inner peripheral surface of the cylindrical portion 24A of the worm wheel 24 and the sliding ridge 38E of the plate 38 is maintained even if the plate 38 is slightly tilted relative to the worm wheel 24 by a force applied to the output gear 40 when the output gear 40 is locked. Also, a radius of curvature of the cross-section of the sliding ridge 38E is relatively small, such that the line contact between the inner peripheral surface of the cylindrical portion 24A of the worm wheel 24 and the sliding ridge 38E is achieved, and the small contact area between the inner peripheral surface of the cylindrical portion 24A of the worm wheel 24 and the sliding ridge 38E is maintained even when the sliding ridge 38 is deformed.

As a result, the generation of noises by the slide movement of the inner peripheral surface of the cylindrical portion 24A of the worm wheel 24 against the sliding ridge 38E of the plate 38 is effectively reduced when the output gear 40 is locked.

Furthermore, since the worm wheel 24 and the plate 38 (output shaft 36) are both made of the resin material, the weight of the geared motor 10 is reduced.

In the above embodiment, the plate (acting as the rotation transmitting portion) 38 and the output gear 40 of the output shaft 36 are integrally made of the resin material. The present invention is not limited to this structure. For example, the output shaft 36 can be formed as the integral body by insert molding. In the insert molding, the plate 38 with the thick portion (acting as the boss) 38C is first molded from a resin material. Then, the output gear 40 made of a metal material is inserted within the thick portion 38C (boss) and is insert molded within the thick portion 38C. In this case, the short cylindrical portion 48B of the cover plate 48 preferably abuts against the outer peripheral portion of the boss (thick portion).

Furthermore, in the above embodiment, the cover plate 48 includes the short cylindrical portion 48B. However, the present invention is not limited to this structure. For example, the output shaft hole 48A of the cover plate 48 can be constructed to abut the thick portion 38C or any other appropriate portion of the output shaft 36. Furthermore, in the above embodiment, the output shaft 36 includes the thick portion 38C. The present invention is not limited to this structure. For example, the thick portion 38C of the output shaft 36 can be eliminated.

In the above embodiment, the cover plate 48 is made of the metal material. However, the material of the cover plate 48 is not limited to this and can be any material, such as a resin material, having an appropriate rigidity.

In the above embodiment, the cover plate 48 is fitted to the inner peripheral portion (cover support surface 18C) of the motor housing 18. However, the present invention is not limited to this arrangement. As long as the motor housing 18 and the cover plate 48 forms the integral structure having the substantially closed cross-section capable of supporting the load acting in the radial direction of the output shaft 36, the cover plate 48 can be fitted to the motor housing 18 in any manner. For example, the cover plate 18 can be fitted to the outer peripheral portion of the motor housing 48 or to both the inner and outer peripheral portions of the motor housing 48.

In the above embodiment, a small radial clearance is provided between the inner peripheral surface of the cylindrical portion 24A of the worm wheel 24 and the sliding ridge 38E formed in the outer peripheral surface of the plate 38 to allow the sliding engagement therebetween. However, a size of this radial clearance can be varied. For example, the radial clearance can be selected such that the inner peripheral surface of the cylindrical portion 24A of the worm wheel 24 is normally spaced away from the sliding ridge 38E of the plate 38 and slidably engages with the sliding ridge 38E of the plate 38 only when the output shaft 36 is tilted or is radially moved relative to the worm wheel 24 more than a predetermined amount or when the worm wheel 24 is urged against the output shaft 36 (more specifically, against the plate 38) to engage therewith by a reaction force exerted from the worm 20. In one instance, the clearance between the inner peripheral surface of the cylindrical portion 24A of the worm wheel 24 and the sliding ridge 38E of the plate 38 can be set such that when one point of the sliding edge 38E of the plate 38 engages the inner peripheral surface of the cylindrical portion 24A of the worm wheel 24, a space of, for example, about 7 to 30 micrometers is left between a diametrically opposed point of the sliding edge 38E of the plate 38 and the opposed inner peripheral surface of the cylindrical portion 24A of the worm wheel 24.

Similarly, a small radial clearance is provided between the inner peripheral surface of the short cylindrical portion 48B of the cover plate 48 and the outer peripheral surface of the thick portion 38C of the output shaft 36 to allow the sliding engagement therebetween. However, a size of this radial clearance can be varied. For example, the radial clearance can be selected such that the inner peripheral surface of the short cylindrical portion 48B of the cover plate 48 is normally spaced away from the outer peripheral surface of the thick portion 38C of the output shaft 36 and slidably engages with the outer peripheral surface of the thick portion 38C of the output shaft 36 only when the output shaft 36 is tilted or is radially moved relative to the short cylindrical portion 48B of the cover plate 48 more than a predetermined amount. In this case, the O-ring 50 arranged around the seal retaining surface 38D in the thick portion 38C of the output shaft 36 should be always pressed radially inwardly against the seal retaining surface 38D by the inner peripheral surface of the short cylindrical portion 48B, so that the penetration of water or the like into the interior of the motor housing 18 is restrained.

Figure 5B:
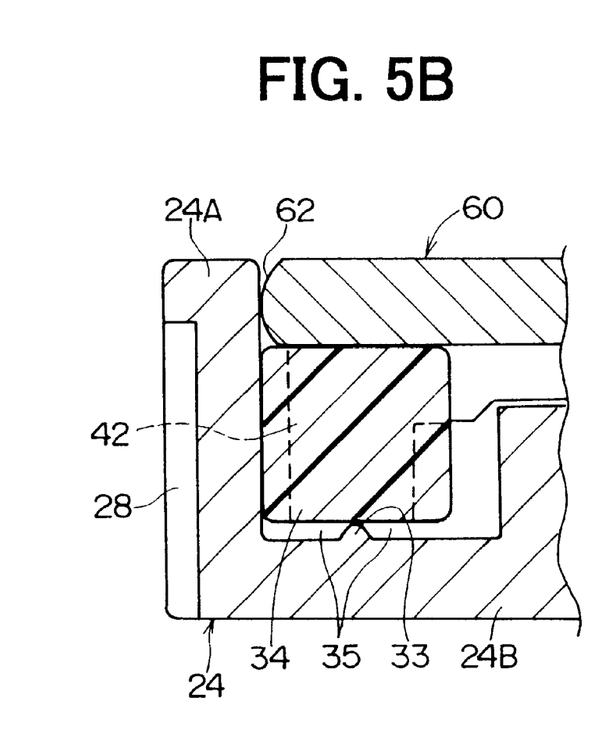
FIG. 5B is an enlarged partial cross-sectional view showing the worm wheel and a modified disk plate of the output shaft in a slidably engaged state.

In the above embodiment, the worm wheel 24 makes the line contact with the plate 38 through the sliding ridge 38E integrally formed with the plate 38. The present invention is not limited to this. For example, as shown in FIG. 5B, a sliding portion 62 having an arcuate cross-section can be formed in an outer peripheral surface of a plate 60 along an entire outer perimeter thereof. The worm wheel 24 can make line contact with the plate 60 through the sliding portion 62.

In the above embodiment, the sliding ridge 38E or sliding portion 62 is formed along the outer peripheral surface of the plate 38, 60. The present invention is not limited to this. For example, the sliding ridge 38E or sliding portion 62 can be formed along the inner peripheral surface of the cylindrical portion 24A of the worm wheel 24 or can be formed along both the inner peripheral surface of the cylindrical portion 24A of the worm wheel 24 and the outer peripheral surface of the plate 38, 60.

Furthermore, in the outer peripheral surface of the plate 38, 60 and/or the inner peripheral surface of the cylindrical portion 24A of the worm wheel 24, the sliding ridge 38E or sliding portion 62 is not required to extend continuously along the entire outer perimeter of the plate 38, 60 and/or the cylindrical portion 24A and can extend discontinuously. Also, the sliding ridge 38E or sliding portion 62 is not required to have the arcuate cross-section and can have any other cross-section as long as the sliding ridge 38E or sliding portion 62 makes the line contact described above. For example, the sliding ridge 38E or sliding portion 62 can have a triangular cross-section.

In the above embodiment, only one sliding ridge 38E is formed in the outer peripheral surface of the plate 38. However, the present invention is not limited to this. For example, a plurality of sliding ridges 38E extending parallel to each other can be provided in the outer peripheral surface of the plate 38.

In the above embodiment, the geared motor 10 includes the worm wheel 24 and the output gear 40 which are rotatably supported about the center shaft 26 secured to the motor housing 18, and the worm wheel 24 is drivingly connected to the output gear 40 through the cushion rubber 34 and the plate 38 to transmit the rotation to the output gear 40. However, the present invention is not limited to this. For example, the worm wheel 24 can be rotatably supported by the motor housing 18, and the output shaft 36 is integrated with the center shaft 26 that is rotatably supported by the motor housing 18. The output shaft 36 can be driven by the worm wheel 24 through the cushion rubber 34 and the plate 38. Furthermore, the output shaft 36 is not required to have the output gear 40. For example, the output shaft 36 can have a socket-like output engaging portion in place of the output gear 40.

Additional advantages and modifications will readily occur to those skilled in the art. The invention in its broader terms is therefore, not limited to the specific details, representative apparatus, and illustrative examples shown and described.

What is claimed is:

1. A geared motor comprising:
   a housing being shaped into a generally cylindrical shape and having a base at one end and an opening at the other end thereof, said housing receiving a worm and a worm wheel, said worm being connected to a rotatable shaft of said motor, said worm wheel being meshed with said worm;
   a support shaft extending along a rotational axis of said worm wheel and having one end secured to said base of said housing and the other end extending out of said housing, said support shaft rotatably supporting said worm wheel;
   an output shaft being rotatably supported about said support shaft and having one end extending out of said housing, said output shaft receiving rotation of said worm wheel; and
   a cover being shaped into a disk shape and covering said opening of said housing, said cover including:
      an output shaft hole penetrating through a center of said cover and rotatably receiving said output shaft therethrough;
      an engaging portion being formed along an outer peripheral edge of said cover and being radially supported by said housing; and
      a shaft support portion being slidably engageable with an outer peripheral surface of said output shaft for radially supporting said output shaft.

2. A geared motor according to claim 1, where said shaft support portion extends continuously all around said outer peripheral surface of said output shaft.

3. A geared motor according to claim 1, wherein said shaft support portion is an inner peripheral surface of a cylindrical portion that protrudes axially from a radially middle part of said cover.

4. A geared motor according to claim 1, wherein said cover further includes an annular recess that extends circumferentially and continuously along one end of said cylindrical portion.

5. A geared motor according to claim 1, wherein said engaging portion of said cover extends along entire said outer peripheral edge of said cover and engages with an inner peripheral surface of said opening of said housing.

6. A geared motor according to claim 1, wherein said engaging portion of said cover includes a rib that extends axially from said outer peripheral edge of said cover and that is tapered toward its base while said cover is not fitted to said housing, said rib being radially resiliently deformable.

7. A geared motor according to claim 1, wherein said cover is made of one of a metal material and a resin material.

8. A geared motor according to claim 1, wherein said cover further includes a wall portion that is located radially inward of said shaft support portion and that is connected to said shaft support portion.

9. A geared motor according to claim 1, further including a radial clearance provided between said shaft support portion and said outer peripheral surface of said output shaft.

10. A geared motor according to claim 1, further including an O-ring placed around said output shaft, said O-ring being radially inwardly urged by said shaft support portion against said output shaft.

11. A geared motor according to claim 1, wherein:

said output shaft includes a rotation transmitting portion and an output gear, said rotation transmitting portion being shaped into a disk shape and including a thick portion axially thickened at a center thereof, said rotation transmitting portion opposing said worm wheel and receiving rotation of said worm wheel, said output gear being secured to said thick portion of said rotation transmitting portion to rotate integrally with said rotation transmitting portion; and said shaft support portion is slidably engageable with an outer peripheral surface of said thick portion of said output shaft.

12. A geared motor according to claim 1, wherein said shaft support portion of said cover extends in a direction parallel to an axial direction of said output shaft.

13. A geared motor comprising:

a worm connected to a rotatable shaft of said motor;

a worm wheel meshed with said worm, said worm wheel being shaped into a generally cylindrical shape and having a base at one end and an opening at another end thereof; and an output shaft having a rotation transmitting portion as an integral part thereof, said rotation transmitting portion being coaxially placed within said worm wheel, said worm wheel being allowed to rotate continuously together with said rotation transmitting portion of said output shaft while said output shaft is not locked, said worm wheel being allowed to rotate only for a predetermined angular distance relative to said rotation transmitting portion of said output shaft when said output shaft is locked, wherein:

an inner peripheral portion of said worm wheel is slidably engageable in line contact with an outer peripheral portion of said rotation transmitting portion of said output shaft through a sliding ridge formed in an outer peripheral portion of said rotation transmitting portion and having an arcuate cross section; and an engaging portion of said inner peripheral portion of said worm wheel makes said line contact with said outer peripheral portion of said rotation transmitting portion, said engaging portion having a generally smooth cylindrical surface and a substantially constant inner diameter along an axial extent of said engaging portion of said inner peripheral portion of said worm wheel.

14. A geared motor according to claim 13, wherein said worm wheel and said rotation transmitting portion are both made of a resin material.

15. A geared motor according to claim 13, wherein said inner peripheral portion of said worm wheel is slidably engageable in line contact with said outer peripheral portion of said rotation transmitting portion continuously all around said outer peripheral portion of said rotation transmitting portion.

16. A geared motor according to claim 13, wherein said inner peripheral portion of said worm wheel is slidably and partially engageable in line contact with said outer peripheral portion of said rotation transmitting portion around said outer peripheral portion of said rotation transmitting portion.

17. A geared motor according to claim 13, wherein said inner peripheral portion of said worm wheel is slidably engageable in line contact with said outer peripheral portion of said rotation transmitting portion through at least one ridge formed in at least one of said inner peripheral portion of said worm wheel and said outer peripheral portion of said rotation transmitting portion.

18. A geared motor according to claim 17, wherein said at least one ridge has an arcuate cross-section.

19. A geared motor according to claim 13, wherein at least one of said inner peripheral portion of said worm wheel and said outer peripheral portion of said rotation transmitting portion has an arcuate cross-section.

20. A geared motor according to claim 13, further including a radial clearance provided between said inner peripheral portion of said worm wheel and said outer peripheral portion of said rotation transmitting portion.

* * * * *